United States Patent [19]

McDonald

[11] 4,137,204

[45] Jan. 30, 1979

[54] CATIONIC METHOD FOR EMULSIFYING ASPHALT-RUBBER PAVING MATERIAL AND A STABLE THIXOTROPIC EMULSION OF SAID MATERIAL

[76] Inventor: Charles H. McDonald, 3130 W. Pierce St., Phoenix, Ariz. 85009

[21] Appl. No.: 851,062

[22] Filed: Nov. 14, 1977

[51] Int. Cl.² ............................................. C08L 91/00
[52] U.S. Cl. .............................. 260/28.5 AS; 260/718; 260/733; 260/745; 106/277
[58] Field of Search ................ 260/28.5 AS, 718, 733, 260/745; 106/277

[56] References Cited

U.S. PATENT DOCUMENTS 3,891,585  6/1975  McDonald ................... 260/28.5 AS
4,018,730  4/1977  McDonald ................... 260/28.5 AS

*Primary Examiner*—M. J. Welsh
*Attorney, Agent, or Firm*—Fulwider, Patton, Rieber, Lee & Utecht

[57] ABSTRACT

A new method is provided for emulsifying an asphalt-rubber pavement repair material into a stable thixotropic emulsion capable of flowing as a liquid upon gentle agitation. The method generally comprises the steps of heating asphalt and rubber to form a jellied reaction product, and admixing an asphalt-rubber soap consisting essentially of water, a cationic water soluble emulsifying agent, a thickener, and aluminum sulfate to form a thixotropic emulsion capable of flowing as a liquid upon gentle agitation.

6 Claims, No Drawings

CATIONIC METHOD FOR EMULSIFYING ASPHALT-RUBBER PAVING MATERIAL AND A STABLE THIXOTROPIC EMULSION OF SAID MATERIAL

BACKGROUND OF THE INVENTION

Asphalt-rubber compositions have been found to be a new and useful pavement material for surfacing and manufacturing roadways, and for repairing cracked roadways and pavements. Such compositions are generally applied by spraying and are difficult to spray because of their high viscosity. Heat may be used to decrease the viscosity but this requires special equipment and experienced personnel in working with the hot material on the job site. Organic solvents may be used to cut such compositions to decrease their viscosity but this adds to the cost of the composition and presents additional problems associated with the handling of organic solvents especially with hot compositions.

Asphalt-rubber compositions have also been applied in the form of a water emulsion which is pourable and sprayable under ambient temperatures. Upon application of such emulsion, the emulsion breaks and the asphalt-rubber composition is deposited on the roadway. Aqueous emulsions of asphalt are known in the art and have been found to be stable and easily pourable and sprayable. A difficulty, however, has been experienced while attempting to emulsify asphalt-rubber compositions containing particulate rubber in that the emulsion tends to "break" or separate upon standing. This is believed to be due to the presence of sulfur in the rubber used in preparing the asphalt-rubber compositions.

In an effort to stablize such emulsions, emulsifiers such as clays and talc have been added to the emulsion to improve their stability. Such emulsifiers do provide for stability but their presence in the emulsion after application to a roadway or pavement presents a risk that the composition will re-emulsify under the action of water and traffic with a consequent washing away of the composition. The presence of such clays and talc also inhibit the initial adhesion of the rubber-asphalt composition to stone aggregate used therewith.

The aforesaid problems have been solved by the method and emulsion described in my Patent, U.S. Pat. No. 4,018,730, which discloses the use of a specially prepared anionic soap to achieve a stable emulsion. Emulsions made with this anionic soap, however, are limited to use with stone aggregate, such as limestone, which has a cationic surface charge. If used with siliceous stone aggregate having an anionic surface charge, such as granite or quartzite, the electrical repulsion prevents a quick adhesion between the aggregate and the asphalt-rubber composition and thereby tends to prevent the emulsion from breaking quickly when applied to a roadway. The asphalt-rubber composition, which is still in an emulsified condition, may therefore be washed away when subjected to the action of rain and traffic. When the electrical charge between the aggregate and the emulsion is of different polarity, the emulsion breaks immediately due to this electrical attraction and the asphalt-rubber composition adheres immediately to such aggregate. The possibility of the asphalt-rubber composition being washed-off the aggregate is thereby eliminated.

It is therefore an object of the present invention to provide a new method for emulsifying asphalt-rubber paving compositions to provide an emulsion that is stable and will not break or settle-out upon storage, and which can be used with stone aggregate having an anionic surface charge. Another object is to provide an emulsified asphalt-rubber paving composition which will not re-emulsify after deposition. Other objects and advantages of the invention will become apparent as the specification proceeds.

SUMMARY OF THE INVENTION

It has been discovered that asphalt-rubber paving compositions may be emulsified with water to provide a stable emulsion that will not break or settle-out upon standing, and which can be used with anionic stone aggregate, if a specially prepared asphalt-rubber soap is admixed therewith. The emulsion formed thereby is thixotropic in nature, i.e., the emulsion is relatively viscous upon standing, which inhibits the separation of particulate rubber from the emulsion but is converted to a pourable and sprayable liquid upon gentle agitation. The asphalt-rubber soap consists essentially of water, a cationic water soluble emulsifying agent, a thickener, and aluminum sulfate, $Al_2(SO_4)_3$.

DESCRIPTION OF A PREFERRED EMBODIMENT

In a preferred embodiment, rubber and asphalt are heated to produce a jellied reaction product as more fully described in my U.S. Pat. No. 3,891,585, which is incorporated by reference and made a part hereof.

The rubber-asphalt reaction product is prepared by heating paving grade asphalt with a penetration range of 10 through 300, to a temperature within the range of from about 350 to about 500° F. and adding particulate rubber thereto. The resulting mixture is thoroughly mixed until the composition gels or becomes jellied. No additional heating is normally required once the rubber is added to the asphalt. The ratio of asphalt to rubber is in the approximate range of about two to about five parts of asphalt for every part of rubber.

All paving grade asphalts from penetration grade 10—10 through 200–300, which includes Pacific Coast User's viscosity gradations AR-1000 to 16,000 are suitable for practicing the instant invention.

Hydrocarbon rubbers are used in the present invention. By the term "hydrocarbon rubber" is meant non-oil resistant asphalt-soluble rubbers. Non-oil resistant asphalt-soluble rubbers are those rubbers that are partially soluble to the extent from about 2 to about 12% by weight in asphalt and are attacked by, react with, or are affected by oils, such as lubricating oils, hydraulic oils and the like. Suitable rubbers that can be employed include unvulcanized, or reclaimed rubbers including natural rubber, (NR, polyisoprene polymer), isoprene rubber (IR, polyisoprene polymer), butadiene rubber (BR, polybutadiene polymer), butadiene-styrene rubber (SBR, butadiene-styrene copolymer) butyl rubber (IIR, the isobutylene isoprene polymer) and ethylene propylene rubber (EPM and EPDM, ethylene propylene copolymers and terpolymers which are unvulcanized, vulcanized or reclaimed.

The reclaimed rubber can be devulcanized or partially devulcanized and can be prepared from vulcanized or unvulcanized rubber by the digester process, Heater or Pan process, reclamation or other conventional reclaiming processes (Maurice Morton, *Introduction to Rubber Technology*, Van Nostrand Reinhold Co., New York, 1959, pps. 404–435). Normally the reclaimed rubber will be prepared from old, worn tires, tire scrap, innertube scrap, retread scrap, tire peel, tire carcass, rubber buffings and other rubber scrap.

In the practice, other types of rubbers, that is oil resistant and/or non-asphalt soluble rubbers have not been found suitable for preparing the hot elastomeric pavement repair material. For example, rubber which has not been found suitable for the composition are: nitrile (NBR, butadiene acrylonitrile copolymers), epichlorohydrin (ECO, epichlorophydrin polymer and copolymer), neoprene rubber (CR, chloroprene polymers), hypalon (CSM, chloro-sulfonated polyethylene polymers), urethane rubber (AU, EU, urethane polymers or elastomers), polysulfide or thiokol rubber (T, organic polysulfides), silicone rubber (Si, organic silicone polymers), fluoro silicon rubber (FSi, fluorinated organic silicone polymers), fluoro elastomer (FTM, fluorocarbon polymers), acrylic rubbers and polyacrylates (ACM, copolymer of acrylic ester and acrylic halide). These rubbers have been found to be unsuitable for the present invention because they do not react in the desired manner with asphalt under the described conditions to form the required jellied composition.

The following types of rubbers are preferred for use in the invention: (1) ground whole tire rubber (with and without carcass fabric residue); (2) unprocessed rubber buffings, that is, rubber buffings that have not been subject to devulcanization or reclaiming processes (a by-product of tire retreading); (3) ground innertubes (natural rubbers and synthetic butyl rubbers); (4) reclaimed rubber; (5) partially devulcanized reclaimed rubber; and (6) asphalt soluble rubber. The preferred particle size for the rubber is from about 4 mesh to about +200 mesh USS. Unprocessed rubber refers to rubber that has not been chemically or thermally altered. Unprocessed rubber includes rubbers that have been ground, screened, decontaminated, and treated to remove metals, cord and fabric therefrom.

Based on about 40 to about 70 parts of said asphalt-rubber reaction product, it has been found that a satisfactory emulsion can be achieved when using the cationic soap of the present invention in amounts between about 30 to 60 parts of said soap. This cationic soap is generally prepared by admixing about 3.0 to about 14 parts of a water soluble, cationic emulsifying agent, about 0.1 to about 2 parts of thickener, about 3 to about 10 parts of a 15% aluminum sulfate solution in water, and about 75 to about 97 parts of water. It must be understood, however, that the invention is not limited to the particular ranges as aforesaid but contemplates any proportion of such materials which will produce a satisfactory emulsion and which one skilled in the art could develop after having the benefit of the teachings of this disclosure.

The cationic water soluble emulsifying agent comprises a mixture of conventional imidazoline and quaternary diamine asphalt emulsifiers. A preferred imidazoline is "Tyfocat-R" which is the trade name of an imidazoline in ammonia made by the National Research and Chemical Company of Hawthorne, California, and is used in amounts from about 1 to about 6 parts by weight of the total weight of said soap. A preferred quaternary amine is "Indulin MK-S" which is the trade name of Westvaco of North Charleston, South Carolina, and is used in amounts from 2 to about 8 parts by weight of the total weight of said soap. Indulin MK-S contains 70% by weight of solids and has a pH of about 9.

It has been found when either the imidazoline or quaternary diamine emulsifier is used individually in said soap, a satisfactory emulsion of the novel asphalt-rubber composition is not achieved. It has been discovered that both the imidazoline and quaternary diamine must be used in combination to achieve a satisfactory emulsion. The combination of the imadazoline and the quaternary diamine appear to produce a synergistic result which is wholly unexpected.

The reaction of the aluminum sulfate is not fully understood but it has been found to be essential to the production of a satisfactory cationic emulsion as disclosed herein. An effort has been made to substitute ammonium sulfate for aluminum sulfate but it has failed. Emulsions made with ammonium sulfate do not produce satisfactory emulsions of the aforesaid novel asphalt-rubber reaction product. This is indeed surprising inasmuch as ammonium sulfate has previously been used to improve the emulsification of asphalt with an imidazoline type asphalt emulsifier.

The water used in preparing the soap of the present invention should be demineralized. The user of tap water is to be avoided because the minerals present therein appear to interfere with the formation of a satisfactory emulsion.

In preparing the emulsion it is preferable to add the jellied asphalt-rubber reaction product to said soap to insure proper dispersion of the ingredients. It has been found that if the emulsifier, thickener, or aluminum sulfate are added directly to the asphalt-rubber or the jellied asphalt-rubber reaction product without first being dissolved in water, they may become coated with rubber, asphalt or the jelled reaction product and thereby rendered ineffectual for purposes of forming the desired emulsion. In the case of the thickeners, however, it has been observed that they may be added directly to the emulsion after the emulsion is formed without any apparent loss of their thickening function.

The thickener may be of the conventional type such as for example, boiled corn starch, cellulose derivatives such as carboxymethylcellulose, hydroxyethyl cellulose, and Natrosol 250 which is a non-ionic cellulose derivative produced by Hercules, Inc., polyoxyethylene stearate, and gums.

An organic solvent, such as kerosene, for example, may be added to the asphalt-rubber mixture just prior to emulsification to improve its sprayability and spreadability when applied in cold weather.

The emulsion sometimes tends to break if the pH of the soap is below 3 and for that reason the pH thereof should be maintained at about 3 to 7 by the addition of an acid such as, HCl for a preferred pH of 5 to 6.

The action of the asphalt-rubber soap is maintaining the emulsion in a stable condition is not fully understood but it has been observed that if any one of the constituents of the soap is not used, the emulsion tends to break.

The examples set forth hereinafter represent different embodiments of the present invention. The soap described in Example 7 is at present considered to be preferred for use with the asphalt-rubber reaction product described therein. These examples are relatively dilute due to relatively high percentages of water which were required because of the power limitations on the laboratory scale mixing apparatus used in preparing these examples. More concentrated forms of the examples may be made by using less water when larger scale commercial stirrers are available. It should be noted that dilute emulsions are much more difficult to stabilize and thus by achieving successful dilute emulsions, the more concentrated forms of such emulsions would also be stable, if not more so.

In the examples reported hereinafter a slight degree of separation of solids from the emulsion was noted over a period of time. Such emulsions are still considered to be successful emulsions within the contemplation of the instant invention because the separated solids are readily re-dispersed upon agitation. In practical operations, the emulsion will be agitated when it is pumped from storage and made ready for use, and thus any such solids will be re-dispersed within the emulsion. Furthermore, such separations occurred in relatively dilute laboratory emulsions. Inasmuch as emulsions prepared for commercial use may be more concentrated when more powerful mixers are available, the resultant emulsion will probably be more stable than corresponding dilute laboratory emulsions, and such separation as observed in certain dilute emulsions will most likely not even appear in more concentrated emulsions.

EXAMPLE 1

An asphalt-rubber cationic soap solution was prepared by admixing 189 grams of water, 11 grams of Tyfocat R which was neutralized in said water to a pH of about 6 with HCl, 5 grams of corn starch, and 11 grams of Indulin MK-S. The soap mixture was boiled for one minute, cooled to room temperature, and then mixed to form a jell.

114 grams of Los Angeles basis asphalt having a Pacific Coast User's viscosity grade of AR-1000 was heated to 410° F., and 38 grams of cryogenic tire peel crushed to a size that will pass a 16 mesh Tyler screen, and be held on a 25 mesh Tyler screen, was admixed therein for at least ten minutes while stirring. The heat was turned off when the tire peel was added and the rubber and asphalt reacted to form a jellied composition. When the temperature of the jellied composition dropped to 270° F., 9.12 grams of kerosene were admixed therein.

The hot jellied composition was thereafter poured into the soap solution prepared as aforesaid and stirred to form an emulsion. The emulsion began to break in a few minutes, and 21 grams of 15% by weight aqueous solution of $Al_2(SO_4)_3$ was added thereto and vigorously stirred to re-emulsify the mixture. The emulsion began to break again in about 20 minutes, but upon adding HCl to bring the pH of the emulsion to about 1, the mixture re-emulsified and produced a successful emulsion.

EXAMPLE 2

Example 1 was repeated except for the use of 19.7 grams of Indulin MK-S in place of 11 grams of Indulin MK-S, and 27 grams of said $Al_2(SO_4)_3$ solution in place of 21 grams of said $Al_2(SO_4)_3$ solution used in Example 1. Three grams of Natrosol were also added. A stable, successful emulsion resulted.

EXAMPLE 3

Example 1 was repeated except for the use of a different ratio of ingredients as set forth below. A stable, successful emulsion resulted.
  Cationic soap solution
  189 grams of water
  11 grams of Tyfocat R plus HCl to yield a Tyfocat solution in said water with a pH of about 1
  16 grams of Indulin MK-S acidified to a pH of 1
  25 grams of the same $Al_2(SO_4)_3$ solution
  3.8 grams of Natrosol
  Asphalt-rubber
  114 grams of the same asphalt
  38 grams of cryogenic tire peel crushed to a size that will pass a 16 mesh Tyler screen and be held on a 40 mesh Tyler screen.
  9.12 grams of kerosene were added when the temperature of the asphalt-rubber jellied reaction product dropped to about 270° F.

EXAMPLE 4

Example 3 was repeated except that Tyfocat R was acidified to a pH of 3.5. When the Indulin MK-S was added, the pH of the soap was 6. A stable, successful emulsion resulted.

EXAMPLE 5

Example 4 was repeated except that the quantities of the Tyfocat R, Indulin MK-S, kerosene, $Al_2(SO_4)_3$, and Natrosol were reduced by one half. A stable, successful emulsion resulted.

EXAMPLE 6

Example 1 was repeated except for the use of a different ratio of ingredients and pH as set forth below. A stable, successful emulsion resulted.
  Cationic soap solution
  147.5 grams of water
  4.2 grams of Tyfocat R plus HCl to yield a Tyfocat solution in said water with a pH of about 3.5
  6 grams Indulin MK-S acidified to a pH of about 6
  12 grams of the same $Al_2(SO_4)_3$ solution
  1.4 grams of Natrosol
  Asphalt-rubber
  114 grams of the same asphalt
  38 grams of the same ground tire peel.
  9.12 grams of kerosene were added when the temperature of the asphalt-rubber jellied reaction product dropped to about 270° F.

EXAMPLE 7

Example 1 was repeated except for the use of a different ratio of ingredients and pH as set forth below. A stable, successful emulsion resulted.
  Cationic soap solution
  92.0 grams of a 7.25% acqueous solution of Tyfocat-R adjusted to a pH of 5.2 with HCl
  3.7 grams of Indulin MK-S
  5.5 grams of the same $Al_2(SO_4)_3$ solution
  0.9 grams of Natrosol
  Asphalt-rubber
  114 grams of the same asphalt
  38 grams of the same ground tire peel
  9.12 grams of kerosene were added when the temperature of the asphalt-rubber jellied reaction product dropped to about 270° F.

EXAMPLE 8

Example 7 was repeated except for the omission of kerosene. The results were the same as in Example 7 except that the viscosity of the emulsion was greater.

While the embodiments of the invention chosen herein for purposes of the disclosure are at present considered to be preferred, it is to be understood that this invention is intended to cover all changes and modifications in all the disclosed embodiments which fall within the spirit and scope of the invention.

I claim:

1. A method for emulsifying an asphalt-rubber pavement material into a stable, thixotropic emulsion capable of flowing as a liquid upon agitation and comprising the steps of:
   a. heating a mixture of about 2 to about 5 parts of paving grade asphalt with a penetration range of 10 through 300 and about 1 part of particulate non-oil resistant asphalt soluble rubber, reclaimed rubber and partially devulcanized reclaimed rubber to a temperature within the range of about 350° F. to about 500° F. to form a jellied reaction product, and
   b. admixing said jellied reaction product with an asphalt-rubber soap consisting essentially of water, a cationic water soluble emulsifying agent comprising a mixture of imidazoline and quaternary diamine asphalt emulsifiers, a thickener, and aluminum sulfate.

2. The method as set forth in claim 1 wherein said soap comprises, in parts by weight, about 75 to about 97 parts of water, about 3 to about 14 parts of said cationic emulsifying agent, about 3 to about 10 parts of about a 15% aluminum sulfate solution in water, and about 0.1 to about 2 parts of a thickener.

3. The method as set forth in claim 2 wherein about 1 to about 6 parts of said soap is an imidazoline emulsifying agent and about 2 to about 8 parts of said soap is a quaternary diamine emulsifier.

4. A stable, thixotropic emulsion of an asphalt-rubber pavement material capable of flowing as a liquid upon gentle agitation comprising:
   a. a mixture of about 2 to about 5 parts of paving grade asphalt with a penetration range of about 10 through 300 to about 1 part of particulate non-oil resistant asphalt soluble rubber selected from the group consisting of whole tire rubber, reclaimed rubber and partially devulcanized reclaimed rubber heated to a temperature within the range of about 350° F. to about 500° F. to form a jellied reaction product, and
   b. an asphalt-rubber soap consisting essentially of water, a mixture of imidazoline and quaternary diamine cationic water soluble emulsifying agents, a thickener, and aluminum sulfate.

5. The emulsion as set forth in claim 4 wherein said soap comprises, in parts by weight, about 75 to about 97 parts of water, about 3 to about 14 parts of said cationic emulsifying agent, about 3 to about 10 parts of about a 15% aluminum sulfate solution in water, and about 0.1 to about 2 parts of a thickener.

6. The emulsion as set forth in claim 5 wherein about 1 to about 6 parts of said soap is an imidazoline emulsifying agent and about 2 to about 8 parts of said soap is a quaternary diamine emulsifier.

* * * * *

UNITED STATES PATENT AND TRADEMARK OFFICE
CERTIFICATE OF CORRECTION

PATENT NO. : 4,137,204
DATED : Jan. 30, 1979
INVENTOR(S) : Charles H. McDonald

It is certified that error appears in the above-identified patent and that said Letters Patent are hereby corrected as shown below:

Column 6, line 46, change "7.25%" to --- 2.75% ---

Signed and Sealed this

Thirty-first Day of July 1979

[SEAL]

Attest:

Attesting Officer

LUTRELLE F. PARKER
*Acting Commissioner of Patents and Trademarks*